March 16, 1943.      R. A. BLACKWELL      2,313,720
BENDING TOOL
Filed April 25, 1940
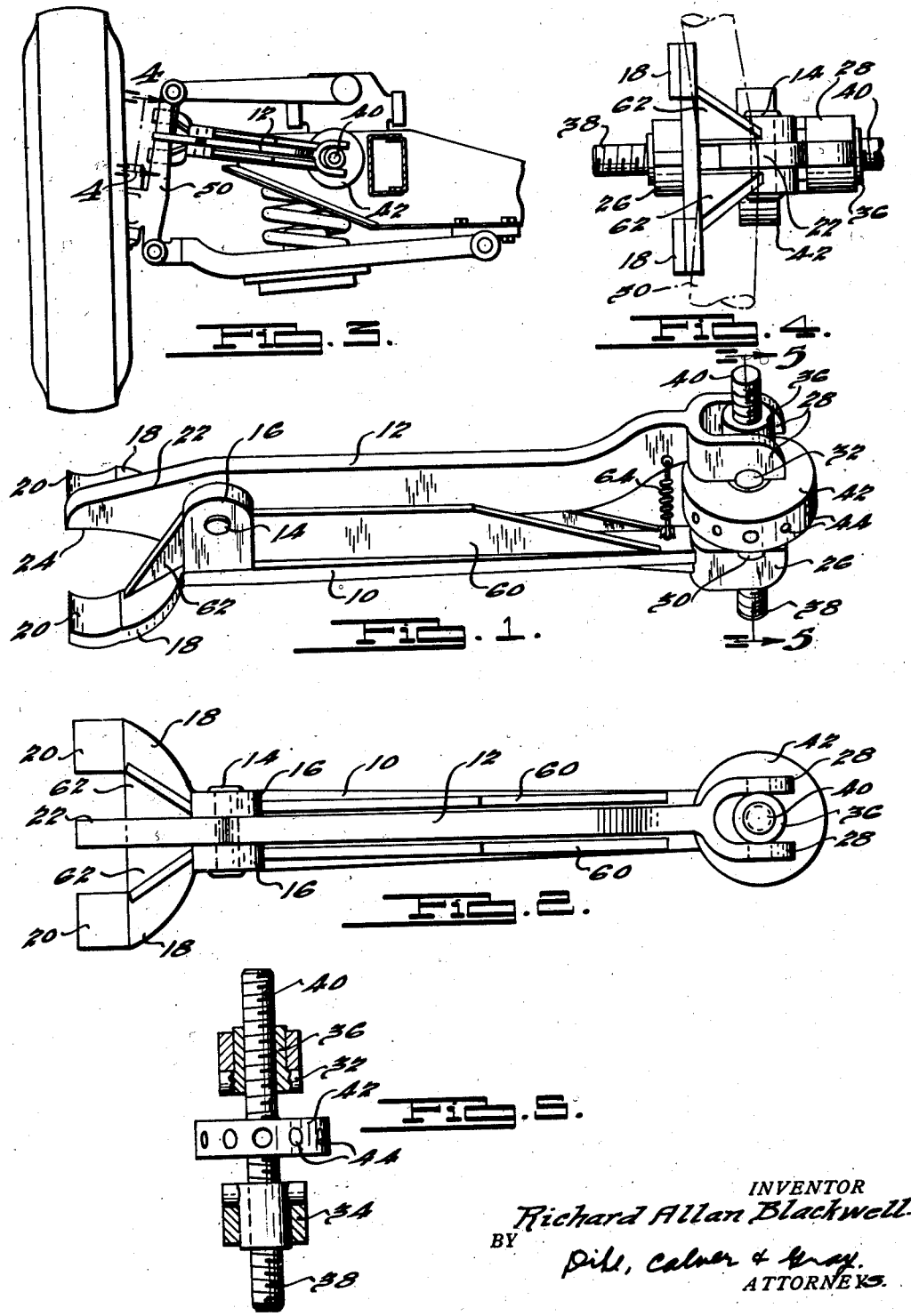
INVENTOR
Richard Allan Blackwell
BY
Pill, Calver & Gray
ATTORNEYS.

Patented Mar. 16, 1943

2,313,720

UNITED STATES PATENT OFFICE 2,313,720

BENDING TOOL

Richard Allan Blackwell, Dearborn, Mich.

Application April 25, 1940, Serial No. 331,519

3 Claims. (Cl. 153—38)

This invention relates to bending devices and more particularly to an improved tool for straightening bent parts of motor vehicles such for example as kingpins and other links by which the wheels of motor vehicles are suspended.

Since the advent of independent suspension of the wheels of motor vehicles, particularly the steerable wheels, difficulty has been experienced in straightening the links which form the interconnection between the wheels and the framework of the superstructure or body of the vehicle.

The wheel supporting links must not be heated because to do so robs them of temper whereupon they are considerably weaker than is necessary to withstand the loads to which they are subjected in service. In view of the relatively small space available, it has been found difficult or impossible to straighten bent wheel supporting links while in place and it has therefore been necessary to partially disassemble the vehicle to remove the parts which require bending or straightening. This additional operation increases the cost of repair of motor vehicles and is objectionable in that in order to determine whether or not the various parts have been bent to the desired shape it is necessary to reassemble them in the vehicle for check purposes and if proper angular relations are not attained it is necessary to again partially disassemble the vehicle and again endeavor to impart to the elements the desired curvature or shape.

An object of this invention is to overcome these disadvantages by the provision of a tool which may be manually operated to impart to bent elements of a motor vehicle a necessary bending or twisting force to restore them to their original shape.

Another object of the invention is to provide a simple manually operable tool which may be conveniently applied to bent wheel supporting members to bend them to a desired shape.

A further object of the invention resides in the provision of a novel manually operable tool which may be readily applied to bent portions of a motor vehicle to straighten bent parts in place without the application of heat.

Yet a still further object is to provide a simple yet rugged bending tool which may be manipulated with minimum effort to apply a much increased force to straighten or otherwise bend various elements the shape of which it is desired to change.

Another object resides in the provision of a simple force applying means which may be readily applied to the kingpin of a motor vehicle or other part thereof to change the shape of said part in the vehicle.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a perspective view disclosing one desirable form of the invention.

Fig. 2 is a top elevation of the device disclosed in Fig. 1.

Fig. 3 is an end elevation of a portion of a motor vehicle illustrating how the device may be operated.

Fig. 4 is a sectional view taken substantially on the line 4—4 of Fig. 3, looking in the direction of the arrows; and Fig. 5 is a sectional view taken substantially on the line 5—5 of Fig. 1, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to the drawing, it will be observed that a pair of lever members 10 and 12 is pivotally connected by means of a stud or bolt 14 extending through the body portion of the member 12 and through a pair of spaced abutments 16 fixed to the member 10. The member 10 is provided with a pair of spaced jaw members 18 having suitable curved engaging portions 20, and the member 12 is preferably formed with a single jaw member 22 having a suitably curved engaging portion 24 positioned to lie between the jaws 18 and the portions 20 of the member 10.

The ends of the members 10 and 12 remote from the jaws 18 and 22 are shaped to provide spaced bearing surfaces 26 and 28 respectively adapted to receive force transmitting stud members 30 and 32 respectively. The stud members 30 and 32 are carried by bosses 34 and 36 respectively. The bosses 34 and 36 are internally threaded to receive oppositely extending bolts 38 and 40 fixed to an actuating wheel 42 interposed between the ends of the members 10 and 12. The threads on the bolts 38 and 40 are oppositely directed whereupon rotation of the wheel 42 by means of any suitable instrument positioned in apertures 44 moves the bosses 34 and 36 in opposite directions to exert a separating force on the ends of the members 10 and 12 through the stud members 30 and 32.

In the operation of the device when it is desired to bend an element, such for example as a kingpin 50 of the wheel suspension mechanism illustrated in Fig. 3, the jaw member 22 may be positioned on the side of the element toward which it is desired to bend the element and the jaw members 18 positioned on the opposite side thereof. The actuating wheel 42 may then be rotated by means of a suitable rod or other member selectively inserted in the apertures 44 to rotate the wheel 42 to operate the members 10 and 12 whereupon the jaw members 18 and 22 on the opposite side of the stud or bolt 14 will be moved together to exert a bending force on the kingpin or other element 50. By means of this device it is possible to straighten or otherwise bend the kingpin or associated link members in place on the vehicle without the application of heat and without partially dismantling the vehicle.

When a bending operation has been completed it is of course possible to check the angular relation of the wheels with respect to camber, caster and tow-in to determine whether the bent elements are in proper alignment. If a desired set has not been imparted to the members the operation may be repeated without partially dismantling the vehicle until the elements which it is desired to bend have attained the desired alignment.

Suitable reinforcing members such for example as webs 60 and 62 may be fixed to the member 10 to reinforce it as illustrated. It will be understood that the proportions of the elements may be varied to embody in the device sufficient strength to perform any bending operation which it is desired to perform, and that elements other than the wheel supporting mechanism of vehicles may be operated upon without departing from the spirit of my invention.

Yielding means such for example as a spring 64 may be interposed between the lever members 10 and 12 to yieldingly urge the bearing surfaces 26 and 28 into engagement with the force transmitting stud members 30 and 32 to prevent the device from becoming disassembled.

The term "bending" as used herein does not necessarily mean that an element is to be bent until straight, since many elements are in proper alignment when they possess a certain degree of curvature. The terms "bending" or "straightening" as applied herein therefore mean the changing of the shape of an element to bring it to a desired form or shape.

I claim:

1. In a bending tool, a pair of lever members, spaced abutments carried by one of said members, a stud pivotally interconnecting said abutments and the other lever member, spaced jaw members carried by the member having the abutments, a single jaw member carried by the other lever member and positioned to lie intermediate the spaced jaw members, spaced abutments carried by each of the lever members remote from the jaw members, an actuating wheel having oppositely extending threaded members motion transmitting means engaging the threaded members and abutments, and resilient means interposed between the lever members adjacent said abutments to yieldingly maintain said abutments of the lever members in engagement with the motion transmitting means.

2. A portable tool for bending the supporting members of vehicle wheels while assembled in the vehicle comprising a pair of lever members pivotally connected adjacent one of their ends, a pair of spaced jaw members carried by one of the levers, a single jaw member carried by the other lever and positioned to lie intermediate said spaced jaw members, the ends of said levers remote from the pivotal connection being bifurcated, an actuating wheel having radially extending apertures and oppositely threaded bolts projecting between the bifurcated end portions of each lever, spaced threaded bosses engaging said bolts, laterally extending stud members carried by the bosses and engaging said bifurcated end portions, and yielding means urging the bifurcated end portions of the levers into engagement with the stud members carried by said bosses.

3. In a bending tool, a pair of lever members, a pair of spaced jaw members carried by one of the lever members, a single jaw member carried by the other lever member, hinge connecting means between said levers adjacent the jaw members, the ends of the levers remote from the jaw members being bifurcated, a rotatable operating wheel having oppositely threaded bolts associated with the bifurcated end portions of the levers, connecting means between said bolts and end portions comprising threaded bosses engaging the bolts and having laterally extending studs engaging the end portions of the levers whereby as the operating wheel is rotated the single jaw member is moved towards the spaced jaw members, and resilient means urging the end portions of the levers in contact with the laterally extending studs.

RICHARD ALLAN BLACKWELL.